United States Patent [19]

Zamora

[11] Patent Number: 4,852,003
[45] Date of Patent: Jul. 25, 1989

[54] METHOD FOR REMOVING ENCLITIC ENDINGS FROM VERBS IN ROMANCE LANGUAGES

[75] Inventor: Antonio Zamora, Chevy Chase, Md.

[73] Assignee: International Business Machines Corporation, Armonk, N.Y.

[21] Appl. No.: 122,305

[22] Filed: Nov. 18, 1987

[51] Int. Cl.⁴ ............................................. G06F 15/38
[52] U.S. Cl. ..................................... 364/419; 364/900
[58] Field of Search ........................ 364/419, 200, 900

[56] References Cited

U.S. PATENT DOCUMENTS 4,439,836 3/1984 Yoshida ............................... 364/419
4,594,686 6/1986 Yoshida ............................... 364/900
4,724,523 2/1988 Kucera ................................ 364/419
4,758,955 7/1988 Chen ................................... 364/419
4,760,528 7/1988 Levin .................................. 364/419

Primary Examiner—Jerry Smith
Assistant Examiner—Kim Thanh Tbui
Attorney, Agent, or Firm—John E. Hoel

[57] ABSTRACT

Romance language verbs are frequently modified by the addition of pronouns called enclitic pronouns. The pronouns can only be added within prescribed grammatical constraints and affect the spelling and, sometimes, the accentuation of the verbs. Many linguistic processes for which automation is desirable, such as synonym look-up or grammatical analysis, require identification of the unmodified verb forms. The methods described herein make is possible to convert a verb modified by enclitic pronouns to its unmodified form.

5 Claims, 3 Drawing Sheets

PROCEDURE FOR REMOVAL OF ITALIAN ENCLITICS

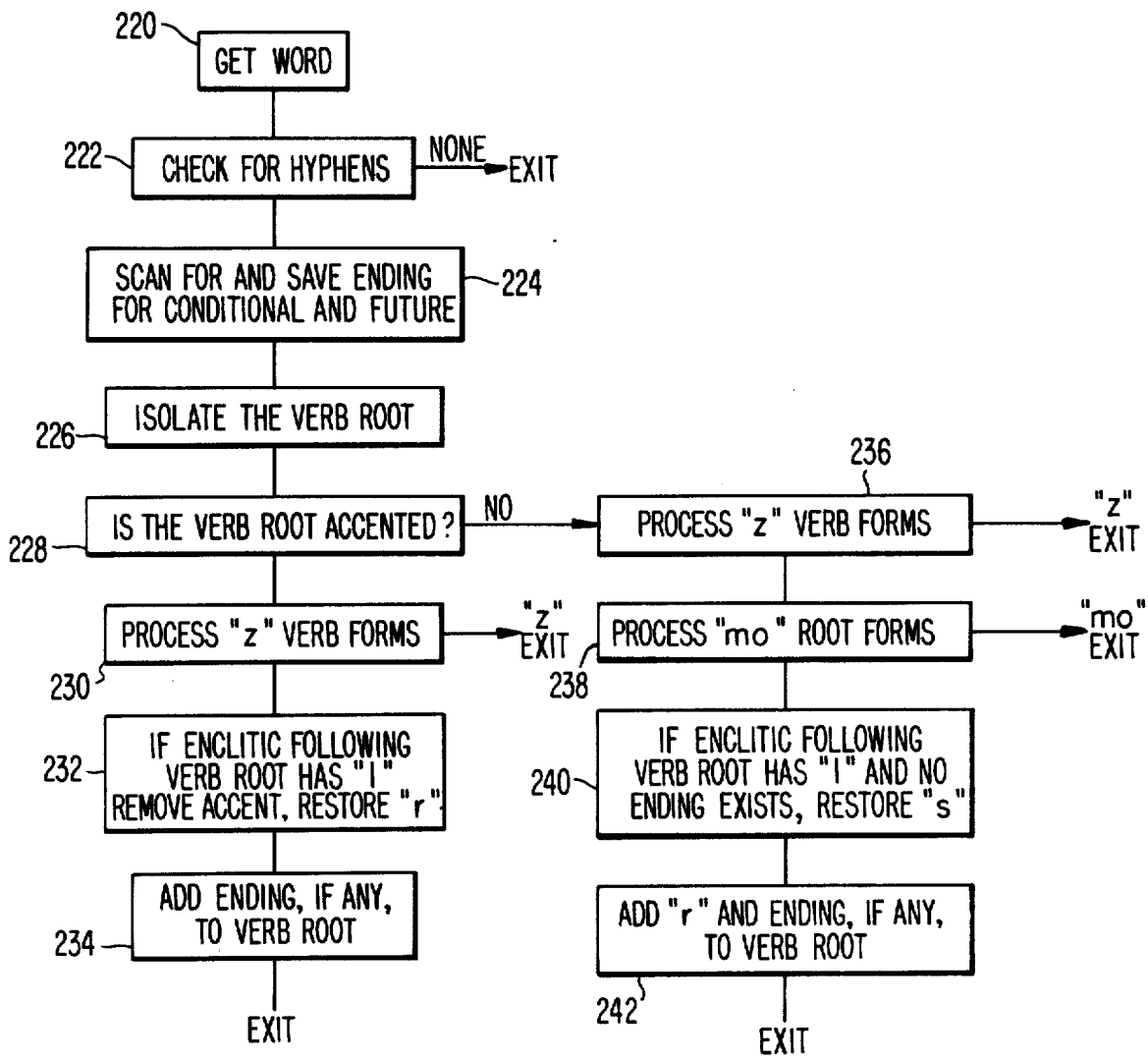

METHOD FOR REMOVING ENCLITIC ENDINGS FROM VERBS IN ROMANCE LANGUAGES

BACKGROUND OF THE INVENTION

1. Technical Field

The invention disclosed broadly relates to data processing techniques and more particularly relates to an improved method for removing enclitic endings from verbs in romance languages.

2. Related Application

A. Zamora, "Paradigm-Based Morphological Text Analysis for Natural Languages," Serial No. 028,437, filed Mar. 20, 1987, assigned to IBM Corporation.

The disclosure of the above cited patent application is incorporated herein by reference to serve as a background for the invention disclosed herein.

3. Background Art

Text processing word processing systems have been developed for both stand-alone applications and distributed processing applications. The terms text processing and word processing will be used interchangeably herein to refer to data processing systems primarily used for the creation, editing, communication, and/or printing of alphanumeric character strings composing written text. A particular distributed processing system for word processing is disclosed in the copening U.S. patent application Ser. No. 781,862 filed Sept. 30, 1985 entitled "Multilingual Processing for Screen Image Build and Command Decode in a Word Processor, with Full Command, Message and Help Support," by K. W. Borgendale, et al. The figures and specification of the Borgendale, et al. patent application are incorporated herein by reference, as an example of a host system within which the subject invention herein can be applied.

BACKGROUND OF THE INVENTION

A. Spanish Language

It is a well-recognized fact that in Spanish, new words are formed when pronouns are attached to certain verb forms. For example, "dame" (English: "give me") is formed from the imperative verb form "da" plus the pronoun "me." These pronouns are called "enclitic" because they attach to the preceding word to form a new word.

There are eleven Spanish pronouns that can be used in enclitic form. Here they are classified by usage:

(1) se: reflexive or impersonal
(2) me, nos: first person (singular, plural)
(3) te, os: second person (singular, plural)
(4) lo, la, lo, los: third person (accusative)
    le, les: third person (dative)

Several enclitic pronouns may be added to a word, thus "dámelo" (English: "give it to me") not only contains a second enclitic, but also adds an accent to the new word to conform with the basic accentuation rules.

There are three basic accentuation rules in Spanish:

1. All words that are stressed in the last syllable and which end in a vowel or "n" or "s" have an explicit accent mark.
2. Words stressed in the penultimate syllable have an explicit accent mark if they end in a consonant which is not "n" or "s."
3. Words stressed before the penultimate syllable always have an explicit accent.

It is understood that the acent mark is written over the vowel of the stressed syllable. In addition, there are rules of euphony that apply to certain verb-pronoun combinations to avoid awkward pronunciations. The plural imperative for the first person "vamos" (English: "we go") loses the final "s" when the enclitic "nos" is added. Thus, "vamos" plus "nos" yields "vámonos" (English: "let's go!"). The double "s" that would result from adding the enclitic "se" to the plural for the first person is omitted so that "hagamos" plus "se" plus "lo" yields "hagámoselo" (English: Let's do it for them!). The final "d" of the plural second person imperative is dropped when the enclitic "os" follows so that "comed" plug "os" yields "comeos" (English: "you eat!").

One peculiarity of Spanish enclitic formation is that not all forms of a verb may form enclitics. Only the infinitive, the gerund (present participle) and the five forms of the imperative may take enclitic pronouns. The forms of the verb "amar" (English: "love") given below show some valid enclitic forms:

| Grammatical form | verb | example | |
|---|---|---|---|
| infinitive | amar | amarla | (English: "to love her") |
| gerund | amando | amandola | (English: "loving her") |
| imperative 2s | ama | amala | (English: "(thou) love her!") |
| imperative 3s | ame | amela | (English: "(he) love her!") |
| imperative 1p | amemos | amemosla | (English: "let's love her!") |
| imperative 2p | amad | amadla | (English: "(you) love her!") |
| imperative 3p | amen | amenla | (English: "(they) love her!") |

In this table 1, 2, and 3 indicate the first, second, and third person; the "s" and the "p" indicate singular and plural form, respectively.

Spanish grammar requires a strict order of priority for enclitic pronouns: "se" always goes first, followed by second person, then first person, and finally third person pronouns. Of course, each of these is optional, but it is rare when more than two pronouns are attached to a verb.

B. Italian Language

An attribute of the Italian language is that new words are formed when pronouns are attached to certain verb forms. For example, "dammi" (English: "give me") is formed from the imperative verb form "da" plus the pronoun "mi" (the first letter of the pronoun is doubled in this case). These pronouns are called "enclitic" because they attach to the preceding word to form a new word. Not all forms of a verb may form enclitics. Only the infinitive, the gerund and the five forms of the mperative may take enclitic pronouns.

There are 17 Italian pronouns and particles that can be used in enclitic form. Here they are classified by usage:

| WEAK | STRONG | |
|---|---|---|
| mi | me | first person singular |
| ci | ce | first person plural |
| ti | te | second person singular |
| vi | ve | second person plural |
| si | se | third person reflexive |
| gli | glie | third person masculine singular |
| mici | — | first person sing. + particle "ci" |
| tici | — | second person sing. + particle "ci" |

| | -continued | |
|---|---|---|
| vici | — | second person plural + particle "ci" |
| COMPLEMENTARY | | |
| lo, li | | third person masculine (singular, plural) |
| la, le | | third person feminine (singular, plural) |
| ne | | third person plural adverbial particle |

Severl enclitic pronouns may be added to a word, but they have to follow specific agglutination rules. The verb form must end in either a weak or a complementary form. If more than one pronoun occurs, the strong form of a pronoun followed by a complementary form is used, except for the combinations "mici," "tici," and "vici" which have been included under the weak forms for uniformity of processing since "ci" is a demonstrative and not a personal pronoun in these cases.

In addition, two spelling modification rules are used: (1) the infinitive form of a verb drops the final "e" when an enclitic pronoun is added except when the infinitive form of the verb ends in "rre" in which case the final "re" is dropped, and (2) if an imperative form of the verb form is stressed in the last syllable, the consonant of the enclitic closest to the verb is doubled (except for "gli," "glie"). The following table shows examples of these cases:

| Grammatical form | verb | example | |
|---|---|---|---|
| infinitive | parlare | parlarti | (English: "to speak to you") |
| infinitive | produrre | produrlo | (English: "to produce it") |
| infinitive | dire | dirtelo | (English: "to say it to you") |
| gerund | pensando | pensandolo | (English: "thinking about it") |
| imperative 2s | di | dillo | (English: "(thou) say it!") |

(2s = second person singular)

The complexity of the rules and multitude of verb forms that may take enclitics require powerful dictionaries and analytical procedures to decompose enclitic verb forms. There are many words which on the basis of morphology, appear to have enclitics, e.g. "Oslo," "cola," but which in reality are not enclitic endings at all. Some verb forms in Italian such as the imperfect subjunctive have endings in "si" which could also be confused with the reflexive pronoun with inadequate analysis. Although there have been some computer based dictionaries that contain verbs with enclitic endings, none of the prior art has addressed the problem of removing the enclitics automatically to obtain the base form of the verb which is necessary for many applications.

OBJECTS OF THE INVENTION

It is therefore an object of the invention to provide an improved method for removing enclitic endings from verbs in romance languages.

It is a further object of the invention to provide an improved method for removing enclitic endings from verbs in Spanish, Italian, Portuguese, French, and other Romance languages.

SUMMARY OF THE INVENTION

These and other objects, features and advantages of the invention are accomplished as disclosed herein. The invention includes a process for the removal of enclitic endings to identify the verb which was used to generate the enclitic form. The process combines the morphological transformations that reverse the enclitic formation rules, accentuation reversal rules and dictionary look-up which can identify valid verb forms and ambiguities.

APPLICATIONS OF THE INVENTION (1) Word verification in word processing systems. The very productive combinatorial mechanisms of enclitic pronouns make it hard to have good coverage of verb forms by exhaustive listing. Therefore, a procedure to identify and generate the forms of the verbs without enclitics can be used as an effective way of word verification.

(2) In any language analysis application such as natural language data base access, it is necessary to interpret queries by isolating the verb forms used in the query. The normalization of enclitic forms makes it possible to process Romance language verb forms.

(3) Machine translation requires identification of enclitic forms and generation of verb forms without their enclitic pronouns. This invention makes it possible to process Romance language verbs for machine translation applications.

BRIEF DESCRIPTION OF THE DRAWINGS

The foregoing and other advantages of the invention will be more fully appreciated with reference to the accompanying figures.

FIG. 3 is a flow diagram of the method for the removal of enclitic endings from Portuguese verbs.

DESCRIPTION OF THE BEST MODE FOR CARRYING OUT THE INVENTION

A. Spanish Language

Figure 1:
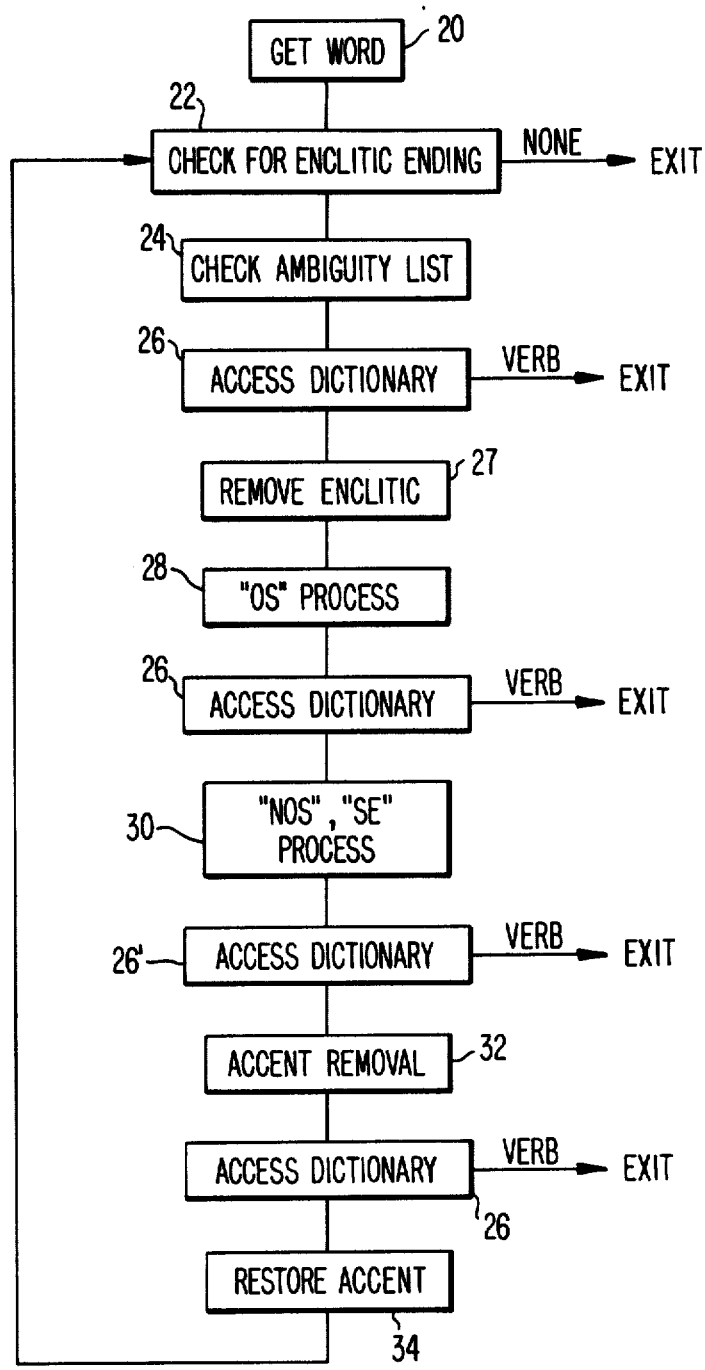
FIG. 1 is a flow diagram of the method for removal of enclitic endings from Spanish verbs.

This embodiment of the invention consists of an iterative process applied to the Spanish language for removal of enclitic endings to identify the verb which was used to generate the enclitic form. The iterative process combines: (1) morphological transformations that reverse the enclitic formation and accentuation rules and (2) look-up in a dictionary that can identify valid verb forms. The process is best described by reference to FIG. 1.

Step 20 specifies the process of getting an input word for the enclitic removal process. The word is converted to lower case if necessary to assure a common font for the dictionary look-up. The ending of the word is checked against the list of 11 enclitic pronouns in Step 22. If the word does not have an enclitic ending or if the enclitics occur in the wrong sequence, or if more than three enclitics are found, then the process terminates since the word does not have valid enclitic endings.

In Step 24 the list of ambiguous words is checked. For example, the word "salte" can be "sal" plus "te" (English: "(thou) get out") or if we interpret the word without an enclitic it means "(you) jump." When a word is found in the list, the output word form is located associated with the input word in the list.

Step 26 is the dictionary look-up process. This involves locating the word form in the dictionary to determine if it is a verb. If it is a verb, its corresponding paradigm (Table 1) is accessed to determine which form of the verb it is. The paradigm matching procedure involves matching the ending of the word form against endings specified in the paradigm table. The endings that match are associated in the table with their corresponding grammatical forms. This matching procedure makes it possible to determine if the verb form is one which can take enclitic endings or not. If it is, the lemma form of the verb (generally the infinitive) can be obtained by replacing the ending that matched with the ending for the infinitive. A successful match terminates the procedure.

The enclitic ending is removed in Step 27. The enclitic is saved because it is referenced in Steps 28 and 30.

Step 28 is the process applied with the enclitic pronoun "os" is removed. Generally, the enclitic "os is simply removed, but if the letter preceding "os" is one of the vowels "a," "e," "i," or "í" (with an accent mark), the enclitic "os" is removed and replaced with a"d." For example, "reíos" becomes "reíd" and "burlaos" becomes "burlad," but "obedeceros" simply becomes "obedecer."

Step 30 is the process applied when the enclitics "nos" or "se" are removed. When these enclitics are found, they are removed and if they are preceded by the characters "mo" (which indicates a plural verb form), an "s" replaces the removed enclitic. For example, "preparémonos" becomes "preparémos," but "ríanse" becomes "rían." This step is independent of accent removal; some of the word forms created at this step will not match against the dictionary because they have incorrect accents.

Step 32 removes the accents, if any, to try to match again against the dictionary with the corrected spelling.

Step 34 restores accents that may have been removed in trying to match an accented word that has multiple enclitics such as "freídmelo" (English: "(you) fry it for me!"). In the first try, only the first enclitic is removed yielding "freídme," but since this does not match, the accent is removed in Step 32. Step 34 restores the accent before sending the word back to Step 22 where the additional enclitic ending will be detected and later removed.

Pseudocode for the preferred embodiment of the process is given in Table 2. While this embodiment of the invention has been described with reference to a specific sequence of steps, the order of some of these steps is somewhat discretionary. It is possible to streamline the process by combining several operations, such as the enclitic removal and the accent removal into one single operation which takes into consideration the syllables of the input word.

| Paradigm for regular ". . . ar"verb | |
|---|---|
| * FORMAS NO PERSONALES | |
| infinitivo | ar (lemma) |
| gerundio | ando |
| participio | ado |
| * MODO INDICATIVO | |
| * presente | |
| pres1 | o |
| pres2 | as |
| pres3 | a |
| pres4 | amos |
| pres5 | ais |
| pres6 | an |
| * preterito imperfecto | |
| pasi1 | aba |
| pasi2 | abas |
| pasi3 | aba |
| pasi4 | abamos |
| pasi5 | abais |
| pasi6 | aban |
| * preterito perfecto simple | |
| pasp1 | e |
| pasp2 | aste |
| pasp3 | o |
| pasp4 | amos |
| pasp5 | asteis |
| pasp6 | aron |
| * futuro | |
| futu1 | are |
| futu2 | aras |
| futu3 | ara |
| futu4 | aremos |
| futu5 | areis |
| futu6 | aran |
| * condicional | |
| cond1 | aria |
| cond2 | arias |
| cond3 | aria |
| cond4 | ariamos |
| cond5 | ariais |
| cond6 | arian |
| * MODO SUBJUNTIVO | |
| * presente | |
| spre1 | e |
| spre2 | es |
| spre3 | e |
| spre4 | emos |
| spre5 | eis |
| spre6 | en |
| * preterito imperfecto | |
| spai1 | ara, ase |
| spai2 | aras, ases |
| spai3 | ara, ase |
| spai4 | aremos, asemos |
| spai5 | arais, aseis |
| spai6 | aran, asen |
| * futuro | |
| sfut1 | are |
| sfut2 | ares |
| sfut3 | are |
| sfut4 | aremos |
| sfut5 | areis |
| sfut6 | aren |
| * MODO IMPERATIVO | |
| impe1 | — |
| impe2 | a |
| impe3 | e |
| impe4 | emos |
| impe5 | ad |
| impe6 | en |

TABLE 2

PSEUDOCODE FOR SPANISH ENCLITIC PROCESS

```
Input:  word length,
        input word.
Output: return code = 8 input word is not a verb OR
                        input word is not a verb with enclitic ending
                    = 4 input word is ambiguous, most likely enclitic
                        enclitic interpretation provided.
                    = 0 input word is a verb with enclitic ending
        If return code is 0 or 4, the input word without the
        enclitic ending and the lemma will be returned.
```

TABLE 2-continued
PSEUDOCODE FOR SPANISH ENCLITIC PROCESS

```
              (The word may have different accentuation and extra
              letters, e.g., "vamonos" will return "vamos" as the
              output word and "ir" as the lemma for the input word.)
     output word length,
     output word.
     lemma length
     lemma for input word.
/* This procedure implements an iterative process for the removal of    */
/* enclitic endings that results in the identification of the lemma of  */
/* the word and the word form from which the enclitic was generated.    */
   Get input _word.
   translate input _word to lower case;
   word _input = input _word;
   loopct = 0;
   prev _code = 0;
alpha:
   loopct = loopct + 1;
   if loopct > 3 then EXIT with rc = 8;
   Check ending and its code:
      ending: (los, nos, las, les, la, le, lo, me, se, te, os)
      code:   ( 1,   2,   1,   1,  1,  1,  1,  2,  4,  3,  3)
   If ending doesn't match, enclitic is not possible EXIT with rc = 8
   /* The codes indicate the priority order in which enclitic pronouns
      are expected to occur, this prevents processing words like
      "tecolote" more than necessary to reject them */
   If code > =0 prev _code then EXIT with rc = 8;
   prev _code = code;
      If word _form_length - enclitic _length > = 2
         then enclitic is possible.
      If enclitic isn't possible EXIT with rc = 8
      Check list of ambiguities
         (e. g., "salte" will be in this list (→ "sal+te" → "salir")
            without this list, paradigm processing would give
            "salte" → "saltar," the process makes it possible to
            resolve "saltela" to → "salte+la" → "saltar."
            In cases where the ambiguity cannot be resolved, e.g.,
            "date" → "da+te" (dar) or "date" (datar), preference
            is given to the enclitic interpretation since the other
            interpretation is readily available through paradigm
            processing.
         (note: words which become ambiguous when the enclitics are
            removed, are also stored in this list, e.g.,
            "vete" → "ve+te" returns "ir" in the lemma in addition
            to "ve" as the output word since "ve" by itself is the
            imperative of "ir" or "ver" but "vete" is never used
            for the latter.
      If word is in list, set output word form, EXIT with rc = 4
      Call paradigm program
      If a verb lemma is available then do;
         /* e.g.: acaramelo => acaramelar */
         if the word _form = input _word then EXIT with rc = 8;
         else set output word form, EXIT with rc = 0;
      end;
      if only non-verb lemmas are available OR word cannot be a verb
         then do; /* e.g.: "este," "este," "solo," "Oslo," "cola" */
         Exit with rc = 8;
      end;
      /* word is not in dictionary OR
         word can be a verb, but a lemma is not available */
      step = 0; /* word-modification step 0 */
      remove enclitic from word _form.
      if we removed "os" and the preceding character is "a," "e," "i" or
         "i" (with an accent mark) then do;
         /* "rei-os," "burla-os" are processed */
         /* "obedecer-os" falls through */
         add "d" to word _form;
         /* Note: It is important to process removal of "os" at this    */
         /* point because if the "d" is not added a non-imperative      */
         /* verb form results (e.g., "rei" instead of "reid," "burla"   */
         /* instead of "burlad").                                       */
      end;
beta:
   Call paradigm program
   If a verb lemma is available then do;
      /* e.g.: dame => da */
      set output word form, EXIT with rc = 0;
   end;
   if only non-verb lemmas are available OR word cannot be a verb then
      EXIT with rc = 8;
   /* word is not in dictionary OR
      word can be a verb, but a lemma is not available */
```

TABLE 2-continued
PSEUDOCODE FOR SPANISH ENCLITIC PROCESS

```
if step = 0 then do; /* may have to add letter */
  step = 1;
  if we removed "nos" or "se" and the preceding two characters
    are "mo" then do;
    /* "preparemonos," "unamo-nos" are processed */
    /* "rianse" falls through */
    add "s" to word _form;
    goto beta;
  end;
  /* fall through to accent removal */
end;
if step = 1 then do; /* may have to remove accent */
  if word _form has no accent then goto alpha;
  /* "freidme-lo," "cose-lo" are processed */
  save _acc = word _form;
  remove accent from word _form;
  step = 2;
  goto beta;
end;
if step = 2 then do; /* we have to restore accent */
  /* "freidme" is restored to "freidme" */
  word _form = save _acc;
end;
goto alpha;
```

B. Italian Language

Figure 2:
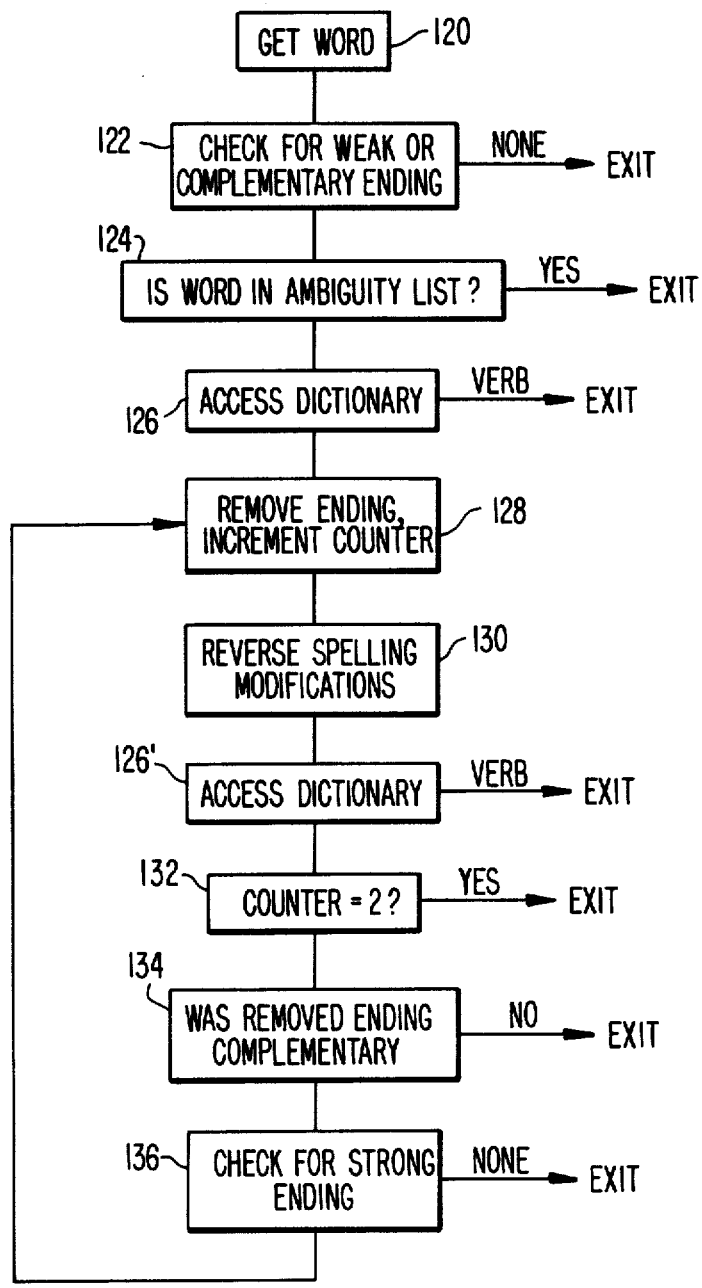
FIG. 2 is a flow diagram of the method for the removal of enclitic endings from Italian verbs.

This embodiment of the invention consists of a process applied to the Italian language for removal of enclitic endings to identify the verb which was used to generate the enclitic form. The process combines: (1) morphological transformations that reverse the enclitic formation and accentuation rules and (2) look-up in a dictionary that can identify valid verb forms. The process is best described by reference to FIG. 2.

Step 120 specifies the process of getting an input word for the enclitic removal process. The word is converted to lower case if necessary to asure a common font for the dictionary look-up.

In Step 122, the ending of the input word is checked against the list of weak and complementary pronouns. If the words does not have an enclitic ending, then the process terminates since the word does not have valid enclitic endings.

In Step 124 the word is checked against the list of ambiguous words. This insures that if a word with an enclitic pronoun can also be a valid verb form, the enclitic form can be recognized as such. The list of ambiguous words consists of the ambiguous word, the corresponding verb form without the enclitic, and optionally, the lemma form of the verb. A match against this list terminates the procedure. For example, the word "segnalo" can be the first person singular present of the verb "segnalare" (English: "to signal") or it can be the third person singular imperative of "segnare" (English: "to mark") plus the enclitic "lo".

Step 126 is the dictionary look-up process. This involves locating the word form in the dictionary to determine if it is a verb. If it is a verb, its corresponding paradigm (Table 3) is accessed to determine which form of the verb it is. The paradigm matching procedure involves matching the ending of the word form against the endings specified in the paradigm table. The endings that match are associated in the table with their corresponding grammatical forms. This matching procedure makes it possible to determine if the verb form is one which can take enclitic endings or not. If it is, the lemma form of the verb (the infinitive) can be obtained by replacing the ending that matched with the ending for the infinitive. A successful match terminates the procedure.

The enclitic ending is removed in Step 128 and saved for examination in Step 134. A counter, initially set to zero, is incremented at this point to keep track of how many enclitic endings have been removed; the counter is referenced in Step 132.

Step 130 reverses the spelling modifications that are applied during enclitic formation. That is, if the letter preceding the enclitic pronoun which was removed is "r," then an "e" or "re" is added since the verb form must be the infinitive. Otherwise, if the letter preceding the removed enclitic is the same as the first letter of the enclitic, then this doubled letter is also removed since this is likely an imperative verb form with stressed final syllable. The exceptions for "gli" and "glie" are taken into consideration.

Step 132 checks to see how many enclitic endings have been removed from the word by referencing the counter incremented in Step 128. If two endings have been removed and the dictionary access has thus far failed to confirm the remainder of the word as a verb, the process ends without identifying an enclitic.

Step 134 checks to see if the ending that was removed was a complementary ending because if it is, the possibility of multiple enclitic pronouns must be examined. However, if the enclitic ending was not complementary then we exit without having found an enclitic ending since the preceding dictionary access failed to find a verb form, and therefore the perceived enclitic ending was a false enclitic.

In Step 136, the ending of the word without the complementary enclitic is checked against the list of strong pronouns. If none is found, the process terminates and the previously found complementary enclitic is considered a false enclitic since the previous dictionary access did not find a verb. However, if a strong pronoun is found, processing continues in Step 128 where the ending is removed and subsequently the spelling is normalized and the dictionary accessed again.

Pseudocode for the preferred embodiment of the process is given in Table 4. While this embodiment of the invention has been described with reference to a specific sequence of steps, the order of some of these steps is somewhat discretionary. It is possible to streamline the process by combining several operations, such as the enclitic removal and the reverse spelling modifications.

TABLE 3

EXAMPLE OF ITALIAN REGULAR VERB PARADIGM

Paradigm for regular "-ere" verb
Example: temere

* FORME IMPERSONALI

| | |
|---|---|
| infinito | emere (lemma) |
| gerundio | emendo |
| participio passato | emuto |

* MODO INDICATIVO
* presente

| | |
|---|---|
| pres1 | emo |
| pres2 | emi |
| pres3 | eme |
| pres4 | emiamo |
| pres5 | emete |
| pres6 | emono |

* imperfetto

| | |
|---|---|
| pasi1 | emevo |
| pasi2 | emevi |
| pasi3 | emeva |
| pasi4 | emevamo |
| pasi5 | emevate |
| pasi6 | emevano |

* passato remoto

| | |
|---|---|
| pasp1 | emei, emetti |
| pasp2 | emesti |
| pasp3 | eme, emette |
| pasp4 | ememmo |
| pasp5 | emeste |
| pasp6 | emerono, emettero |

* futuro semplice

| | |
|---|---|
| futu1 | emero |

TABLE 3-continued

EXAMPLE OF ITALIAN REGULAR VERB PARADIGM

| | |
|---|---|
| futu2 | emerai |
| futu3 | emera |
| futu4 | emeremo |
| futu5 | emerete |
| futu6 | emeranno |

* MODO CONDIZIONALE
* presente

| | |
|---|---|
| cond1 | emerei |
| cond2 | emeresti |
| cond3 | emerebbe |
| cond4 | emeremmo |
| cond5 | emereste |
| cond6 | emerebbero |

* MODO CONGIUNTIVO
* presente

| | |
|---|---|
| spre1 | ema |
| spre2 | ema |
| spre3 | ema |
| spre4 | emiamo |
| spre5 | emiate |
| spre6 | emano |

* imperfetto

| | |
|---|---|
| spai1 | emessi |
| spai2 | emessi |
| spai3 | emesse |
| spai4 | emessimo |
| spai5 | emeste |
| spai6 | emessero |

* MODO IMPERATIVO

| | |
|---|---|
| impe1 | — |
| impe2 | emi |
| impe3 | ema |
| impe4 | emiamo |
| impe5 | emete |
| impe6 | emano |

TABLE 4

PSEUDOCODE FOR ITALIAN ENCLITIC PROCESS

```
Input: word length,
       input word.
Output: return code = 8 input word is not a verb OR
                        input word is not a verb with enclitic ending
                    = 4 input word is ambiguous, most likely enclitic
                        enclitic interpretation provided.
                    = 0 input word is a verb with enclitic ending
        If return code is 0 or 4, the input word without the
        enclitic ending and the lemma will be returned.
        (E.g., "parlarti" will return "parlare" as the
        word form without the enclitic.)
        output word length,
        output word.
        lemma length
        lemma for input word.
/* This procedure implements an iterative process for the removal of    */
/* enclitic endings that results in the identification of the lemma of  */
/* the word and the word form from which the enclitic was generated.    */
   Get input __word.
   translate input __word to lower case;
   Check for one of the following endings:
      (mi, ci, ti, vi, si, gli, mici, tici, vici, lo, li, la, le, ne)
   If ending doesn't match, enclitic is not possible; EXIT with rc = 8
   Check list of ambiguities.
      Note: Preference is given to the enclitic interpretation
      since the other interpretation is readily available through
      paradigm processing.
   If word is in list, set output word form, EXIT with rc = 4
   If word __form __length - enclitic __length >= 2
      then enclitic is possible.
   If enclitic isn't possible EXIT with rc = 8
   Call paradigm program (access dictionary).
   If a verb lemma is available then EXIT with rc = 8;
   if only non-verb lemmas are available OR word cannot be a verb
      then do; /* e.g.: "Oslo," "cola" */
      EXIT with rc = 8;
      end;
         /* word is not in dictionary OR
            word can be a verb, but a lemma is not available */
```

TABLE 4-continued
PSEUDOCODE FOR ITALIAN ENCLITIC PROCESS

```
Counter = 0;
alpha:
    remove enclitic from word _form.
    Counter = Counter + 1; /* increment counter */
    If the word _form ends in "r" add "e" to word _form and look it up
        in the dictionary, if not found add "re" instead of "e."
    else if the last character of the word _form is the same as the
        first character of the removed enclitic then remove the last
        character of the word _form.
    Call paradigm program (access dictionary)
    If a verb lemma is available then do;
        set output word form, EXIT with rc = 0;
    end;
    If only non-verb lemmas are available OR word cannot be a verb
        then EXIT with rc = 8;
    /* word is not in dictionary OR
        word can be a verb, but a lemma is not available */
    If Counter = 2 then EXIT with rc = 8;
    If enclitic removed was not one of the following:
        (lo, li, la, le, ne) then EXIT with rc = 8;
    Check for one of the following endings:
        (me, ce, te, ve, se, glie)
    If ending doesn't match EXIT with rc = 8
    If word _form _length - enclitic _length < 2 then EXIT with rc = 8
    goto alpha;
```

C. Portuguese Language

Structure of Portuguese Enclitic Pronouns

Portuguese enclitic pronouns, unlike Spanish or Italian enclitics, may be embedded within verb forms. The following paragraphs describe the rules for forming these enclitics. This information is then used in the design of an algorithm to remove the enclitics from a verb form to generate the original form of the verb to which the enclitic pronouns were added.

| Categories of pronouns and contractions: | | |
|---|---|---|
| Reflexive Pronoun (RP): | | |
| Person | | |
| -se | 3 | |
| Personal Pronouns (PP): | | |
| Number,Person | | Case: Accusative and Dative |
| -me | | S,1 |
| -te | | S,2 |
| -nos | -no | P,1 |
| -vos | -vo | P,2 |
| Impersonal Pronouns (IP): | | |
| Gender,Number,Person | | Case: Accusative |
| -o -lo -no | | M,S,3 |
| -os -los -nos | | M,P,3 |
| -a -la -na | | F,S,3 |
| -as -las -nas | | F,P,3 |
| Indirect Object Pronouns (IO): | | |
| Number,Person | Case: Dative | |
| -lhe | S,3 | |
| -lhes | P,3 | |
| PP/IP contractions (PPIPC): | | |
| Case: Dative + Accusative | | |
| me + IP | te + IP | |
| m'o -mo | -t'o -to | |
| -m'os -mos | -t'os -tos | |
| -m'a -ma | -t'a -ta | |
| -m'as -mas | -t'as -tas | |
| IO / IP contractions (IOIPC): | | |
| Case: Dative + Accusative | | |
| lhe + IP | | |
| -lh'o -lho | | |
| -lh'os -lhos | | |
| -lh'a -lha | | |
| -lh'as -lhas | | |

Brazilian Portuguese can use the contractions with apostrophes and also the special contraction -lh' instead of -lhe- when the enclitic is embedded by itself in the future or conditional form of the verb, e.g., dar-lh'emos.

General Enclitic Formation Rules

Any verb form may have from one to three enclitics. Each enclitic is appended to or embedded in the verb form separated by a hyphen. If one enclitic is used, it can be either RP, PP, IO, IP, PPIPC or IOIPC. If two enclitics are used, they can be PP+IP, RP+PP, RP+IO, RP+PPIPC or RP+IOIPC. The combination RP+IP is never used. If three enclitics are used only RP+PP+IP is valid, where PP is "nos" or "vos" subject to the transformation rules.

Each enclitic pronoun is separated from the verb form or from the previous pronoun by a hyphen. Contractions, except -lh' by itself, are considered to be two pronouns and are used in the combinations stated above. The IP forms starting with "l" or "n" are used only when the transformation rules given below apply.

Embedding Rules

Future and conditional verb forms are decomposed into stem and ending before the enclitics are embedded, then the ending is added following the enclitics and separated from them by a hyphen. The verb stem or the enclitics themselves may undergo transformations according to the rules given below.

The future endings are: -ei, -ás, -á, -emos, -eis, -ão.
The conditional endings are: -ia, -ias, -ia, -íamos, -íeis, -iam.
Examples:
  dar-lhe-emos
  dar-lho-emos The future and conditional of the verbs "fazer," "dizer," and "trazer" are irregular in that they are derived from the short infinitive of Latin "far(e)," "dir(e)," "trar(e)," but the rules for embedding are the same as above and also follow the transformation rules, e.g., farei+o=>f á-lo-ei.

Transformation Rules

The IP forms -lo, -los, -la, and -las exist only as transformations of the forms -o, -os, -a, and -as under the following two conditions:

(1) When an infinitive verb form (or a future or a conditional which consists of the infinitive plus an ending) needs to take the enclitics -o, -os, -a, or -as, the "r" of the infinitive stem is dropped and the enclitic is transformed to -lo, -los, -la, or -las, respectively. If the vowel preceding the "r" is "a," it changes to "á," if it is "e" but not "õe," it changes to "ê," and if it is "o" it changes to "ô."

(2) When forms ending in "z" of the verbs "trazer," "fazer," "dizer" and their derivatives such as "afazer," "satisfazer," "bendizer," etc., need to take the enclitics -o, -os, -a, or -as, the "z" is dropped and the enclitic is transformed to -lo, -los, -la, or -las, respectively. If the vowel preceding the "z" is "a," it changes to "á" and if it is "e" it changes to "é."

(3) When a verb form ending in "s" needs to take the enclitics -o, -os, -a, or -as, the "s" is dropped and the enclitic is transformed to -lo, -los, -la, or -las, respectively.

(4) The final "s" of a first person plural verb form ending in "mos" is dropped when followed by the enclitic "-nos" to generate "mo-nos." This rule does not apply to the future and conditional forms which embed the enclitics.

(5) When the pronouns "nos" and "vos" are to be followed by -o, -os, -a or -as, the "s" of the "nos" or "vos" is dropped and the following enclitic is transformed to -lo, -los, -la, or -las, respectively.

These rules apply even when the enclitic endings are embedded.

Example:

| dar + o | => | d a-lo |
| traz + o | => | tr a-lo |
| p ões + o | => | p õe-lo |
| darei + o | => | d a-lo-ei |
| daria + as | => | d a-las-ia |
| viveriam + o | => | viv e-lo-iam |
| trazes + nos + o | => | trazes-no-lo |
| trazem + vos + o | => | trazem-vo-lo |
| dispor + o | => | dispo-o-lo |

The IP forms -no, -nos, -na, and -nas are transformations of the forms -o, -os, -a and -as when they occur after a verbal form ending with the letter "m" or after the nasal vowel combinations "ão" and "õe." The fact that the ending -nos is also a personal pronoun is a potential ambiguity.

Example: lavavam + os => lavavam-nos
         trazem + o   => trazem-no

```
/* Pseudocode for Portuguese Enclitic Process            */
/* Antonio Zamora - September 1, 1987                    */
         Input:  word length,
                 word in codepage 500 character set.
         Output: return code = 8 input word is not a verb OR
                                  input word is not a verb with enclitic
                                  ending
                             = 4 input word is ambiguous, most likely
                                  enclitic interpretation provided
                             = 0 input word is a verb with enclitic
                                  ending
                 If return code is 0 or 4, the input word without the
                 enclitic ending and the lemma will be returned.
word length,
/* This procedure implements a process for the removal of */
/* enclitic endings that results in the identification of */
/* the word form from which the enclitic was generated.   */
    Get input __word.
    translate input __word to lower case;
    word = input __word;
    scan the word for a hyphen;
    if word has no hyphen EXIT with rc = 8;
    scan from the end of the word for a hyphen or apostrophe;
    ending = substring from hyphen or apostrophe to end of
    word.
    if ending = 'ei' | 'as' | 'a' | 'emos' | 'eis' | 'ão' |
                'ia' | 'ias' | 'iamos' | 'ieis' | 'iam'
        then save ending;
        else ending = '';
    scan from the beginning of the word for a hyphen;
    head = substring of word up to hyphen;
    if the letter preceding the hyphen is 'a', 'e', or 'o'
    then do;
        if ending = '' and
        head is a form of "fazer," "dizer" or "trazer" that should
    end in "z" then remove accent, add "z" and EXIT with rc = 0;
        if the next enclitic is '-la', '-las', '-lo', '-los'
    followed by a hyphen or the end of the word then do;
                change 'a' in head to 'ar'
                or change 'e' in head to 'er';
        end;
        output __word = head || ending;
        EXIT with rc = 0;
    end;
/* process unaccented head */
if ending = '' then do;
```

```
          if head is a form of "fazer," "dizer" or "trazer"
that should end in "z" then add "z" and EXIT with rc = 0;
          if the last two letters preceding the hyphen are 'mo'
then do;
          if (the next enclitic is '-la', '-las', '-lo', '-los'
followed by a hyphen or the end of the word) |
                (the next enclitic is '-nos' followed by end of word) |
                (the next enclitic is '-no' followed by hyphen)
then do;
     change 'mo' in head to 'mos'
     output __word = head;
     EXIT with rc = 0;
     end;
end;
if the next enclitic is '-la', '-las', '-lo', '-los' then do;
     head = head + 's';
     output __word = head;
     EXIT with rc = 0;
  end;
end;
/* there is an ending */
if the next enclitic is '-la', '-las', '-lo', '-los' then
     head = head + 'r';
     output __word = head || ending;
     EXIT with rc = 0;
```

The process is best described by reference to FIG. 3.

Step 220 specifies the process of getting an input word for the enclitic removal process.

In Step 222, the word is checked to make sure it has hyphens. If the word does not have hyphens it cannot have a Portuguese enclitic ending and the process terminates.

In Step 224, the last hyphenated string of the word is checked to see if it is a conditional or future verb ending. If it is, the ending is saved for future use.

In Step 226, the first string of the word (up to the first hyphen) is isolated. This corresponds to the verb root or the head of the word. This verb rood will be examined to determine subsequent processing.

Step 228 examines the last character of the verb root to see if it is accented. If it is, processing continues in Step 230. Unaccented verb roots are processed starting in Step 236.

Step 230 applies the "z" process. This consists of identifying by look-up in a list the accented verb roots that should be restored to "z" rather than to "r." The list consists of entries such as "contraf á" which comes from "contrafaz" and other verb forms which are derived from the verbs "fazer," "dizer" and "trazer." The "z" process applies only when there are no conditional or future endings.

Step 232 checks to see if the enclitic following the verb root is "-la," "-las," "-lo" or "-los." If it does, then the accented letter is replaced by the unaccented letter and the "r" is restored for the verb root.

Step 234 adds the future or conditional ending, if any, to the verb root to create the reconstituted verb and the process terminates.

Step 236 applies the "z" process to verb roots without accents. The process is identical to Step 230, except that the list of words examined consists of unaccented entires such as as "contrafi" which comes from "contrafiz."

Step 238 applies the "mo" process. This process examines verb roots that end in "mo" to determine whether an "s" has been elided. If the enclitic following the verb root is "-la," "-las," "-lo," "-los" or "-nos," or "-no" followed by another enclitic, then an "s" is added to the verb root and the process terminates.

Step 240 checks to see if the enclitic following the verb root is "-la," "-las," "-lo" or "-los." If it does and there is no future or conditional ending, an "s" is restored for the verb root and the process terminates.

Step 242 adds an "r" plus the future or conditional ending, if any, to the verb root to reconstitute the verb and the process terminates.

D. French Language

French Enclitics

French enclitics are appended to the end of a verb separated by hyphens. The presence of the enclitic does not affect the spelling or the accentuation of the preceding verb. Thus, French enclitics are the easiest to recognize and remove in order to restore the verb to its original state. In addition to enclitics, some French words append adverbial particles which must be differentiated from the enclitics.

The following enclitic pronouns are used in French: ce, ces, cet, cette, elle, elles, en, eux, il, ils, je, la, le, les, leur, lui, me, moi, nous, on, te, toi, tu, vous, and y. Sometimes the pronouns are separated from the verb by the "euphonic" particle "t" as in "a-t-il." The "t" is used only for euphonic purposes and does not represent a pronoun. The pronouns "me" and "te" are contracted when followed by certain other pronouns. Thus, "me" followed by "en" is contracted to "m'en" as in "montrez-m'en" (show it to me). Except for these euphonic and contraction conventions, one or more French enclitic pronouns can be appended at the end of the verb separated by hyphens, e.g., "donnez-le-moi" (give it to me). The order of these pronouns is governed by the rules of French grammar.

In addition to enclitic pronouns, French words can take the adverbial particles "ci" and "l á" separated by hyphens (e.g., "fille-ci"). These should not be confused with enclitic pronouns.

Although specific embodiments of the invention have been disclosed, it will be understood by those having skill in the art that minor changes can be made to the form and the details of those disclosed embodiments without departing from the spirit and the scope of the invention.

What is claimed is:

1. A computer process for removing enclitic pronouns to identify the verb which was used to generate the enclitic form in a romance language, comprising the steps of:

storing a plurality of possible enclitic pronouns, each said enclitic pronoun having associated therewith a priority order value indicating the sequential order of occurrence which the associated enclitic pronoun is permitted to assume in a word having plural, sequential enclitic pronouns;

inputting an input word from an input word stream;

comparing said input word with said plurality of possible enclitic pronouns to identify a last occurring enclitic pronoun in said input word;

storing a first priority order value associated with said last occurring enclitic pronoun;

removing said last occurring enclitic pronoun from said input word, leaving a remainder word portion;

comparing said remainder word portion with said plurality of possible enclitic pronouns to identify a second last occurring enclitic pronoun in said input word;

comparing said first priority order value with a second priority order value associated with said second last occurring enclitic pronoun in said input word;

outputting a representation of said remainder word portion if said second priority order value is not greater than said first priority order value;

if said second priority order value is greater than said first priority order value, removing said second last occurring enclitic pronoun from said remainder word portion, leaving a second remainder word portion, and outputting a representation of said second remainder word portion.

2. A computer process for removing enclitic pronouns to identify the verb which was used to generate the enclitic form in a romance language, comprising the steps of:

storing a plurality of possible enclitic pronouns, each said enclitic pronoun having associated therewith a priority order value indicating the sequential order of occurrence which the associated enclitic pronoun is permitted to assume in a word having plural, sequential enclitic pronouns;

inputting an input word from an input word stream;

comparing said input word with said plurality of possible enclitic pronouns to identify a last occurring enclitic pronoun in said input word;

storing a first priority order value associated with said last occurring enclitic pronoun;

comparing said input word with a list of ambiguous words and producing an output word form when a match is made;

accessing a dictionary to determine if said input word is a verb and accessing a corresponding paradigm to determine a verb form for said input word, by matching the ending of said input word against an ending specified in a paradigm table wherein endings that match are associated in the table with their corresponding grammatical forms, to determine if said verb form is one which can take enclitic pronouns, the lemma form of the verb being obtained by replacing the matched ending with ending for the infinitive;

if said verb form is one which can take enclitic pronouns, outputting said lemma representing the verb form of said input word with said last occurring enclitic pronoun removed;

if said verb form is not one which can take enclitic pronouns, removing said last occurring enclitic pronoun from said input word, leaving a remainder word portion;

comparing said remainder word portion with said plurality of possible enclitic pronouns to identify a second last occurring enclitic pronoun in said input word;

accessing said dictionary to determine if said remainder word portion is a verb and accessing a corresponding paradigm to determine a verb form for said remainder word portion, by matching the ending of said remainder word portion against an ending specified in a paradigm table wherein endings that match are associated in the table with their corresponding grammatical forms, to determine if said verb form thereof is one which can take enclitic endings, the lemma form of the verb being obtained by replacing the matched ending with ending for the infinitive;

comparing said first priority order value with a second priority order value associated with said second last occurring enclitic pronoun in said input word;

if said second priority order value is greater than said first priority order value, and if said verb form of said remainder word portion can take an enclitic pronoun, outputting said lemma representing the verb form of said remainder word portion with said second last occurring enclitic pronoun removed.

3. The method of claim 2 modified to reference a list of ambiguous words to be able to output multiple verb forms when appropriate.

4. The method of claim 2 modified to output a list of enclitic pronouns in addition to verb forms.

5. The method of claim 2 modified to apply morphological transformations including addition or removal of letters or accents to reconstruct the verb form without the enclitics.

* * * * *